United States Patent
Li et al.

(10) Patent No.: US 10,809,402 B2
(45) Date of Patent: Oct. 20, 2020

(54) NON-UNIFORM OPTIMAL SURVEY DESIGN PRINCIPLES

(71) Applicant: CONOCOPHILLIPS COMPANY, Houston, TX (US)

(72) Inventors: Chengbo Li, Houston, TX (US); Charles C. Mosher, Houston, TX (US); Frank D. Janiszewski, Houston, TX (US); Laurence S. Williams, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/641,916

(22) Filed: Jul. 5, 2017

(65) Prior Publication Data

US 2018/0335536 A1 Nov. 22, 2018

Related U.S. Application Data

(60) Provisional application No. 62/506,859, filed on May 16, 2017.

(51) Int. Cl.
*G01V 1/28* (2006.01)
*G01V 1/36* (2006.01)
(Continued)

(52) U.S. Cl.
CPC ............ *G01V 1/368* (2013.01); *G01V 1/3808* (2013.01); *G01V 2210/324* (2013.01)

(58) Field of Classification Search
CPC . G01V 1/368; G01V 1/3808; G01V 2210/324
(Continued)

(56) References Cited

U.S. PATENT DOCUMENTS 2,906,363 A   9/1959  Clay
3,747,055 A   7/1973  Greene
(Continued)

FOREIGN PATENT DOCUMENTS

WO   WO2008073178      1/2008
WO     2010149589 A2  12/2010
(Continued)

OTHER PUBLICATIONS

International Search Report, PCT/US2017/040796 dated Sep. 13, 2018; 2 pgs.
(Continued)

*Primary Examiner* — Daniel L Murphy
(74) *Attorney, Agent, or Firm* — Polsinelli PC (57) ABSTRACT

Method for acquiring seismic data is described. The method includes determining a non-uniform optimal sampling design that includes a compressive sensing sampling grid. Placing a plurality of source lines or receiver lines at a non-uniform optimal line interval. Placing a plurality of receivers or nodes at a non-uniform optimal receiver interval. Towing a plurality of streamers attached to a vessel, wherein the plurality of streamers is spaced apart at non-uniform optimal intervals based on the compressive sensing sampling grid. Firing a plurality of shots from one or more seismic sources at non-uniform optimal shot intervals. Acquiring seismic data via the plurality of receivers or nodes.

20 Claims, 6 Drawing Sheets

(51) Int. Cl.
*G01V 1/00* (2006.01)
*G01V 1/38* (2006.01)

(58) Field of Classification Search
USPC .......................................................... 367/15
See application file for complete search history.

(56) References Cited

U.S. PATENT DOCUMENTS

| | | | |
|---|---|---|---|
| 3,747,056 | A | 7/1973 | Treybig et al. |
| 3,840,845 | A | 10/1974 | Brown |
| 3,877,033 | A | 4/1975 | Unz |
| 4,330,873 | A | 5/1982 | Peterson |
| 4,404,664 | A | 9/1983 | Zachariadis |
| 4,509,151 | A | 4/1985 | Anderson |
| 4,553,221 | A | 11/1985 | Hyatt |
| 4,559,605 | A | 12/1985 | Norsworthy |
| 4,596,005 | A | 6/1986 | Frasier |
| 4,597,066 | A | 6/1986 | Frasier |
| 4,852,004 | A | 7/1989 | Manin |
| 4,958,331 | A | 9/1990 | Wardle |
| 4,967,400 | A | 10/1990 | Woods |
| 4,992,990 | A | 2/1991 | Langeland et al. |
| 5,092,423 | A | 3/1992 | Petermann |
| 5,168,472 | A | 12/1992 | Lockwood |
| 5,353,223 | A | 10/1994 | Norton |
| 5,487,052 | A | 1/1996 | Cordsen |
| 5,517,463 | A | 5/1996 | Hornbostel |
| 5,774,417 | A | 6/1998 | Corrigan et al. |
| 5,787,051 | A | 7/1998 | Goodway |
| 5,835,450 | A * | 11/1998 | Russell .................. G01V 1/201 367/20 |
| 5,963,879 | A * | 10/1999 | Woodward .............. G06F 17/10 367/56 |
| 5,973,995 | A | 10/1999 | Walker |
| 6,009,042 | A | 12/1999 | Workman et al. |
| 6,493,636 | B1 | 12/2002 | Dekok |
| 6,509,871 | B2 | 1/2003 | Bevington |
| 6,691,038 | B2 | 2/2004 | Zajac |
| 6,876,599 | B1 | 4/2005 | Combee |
| 7,167,412 | B2 | 1/2007 | Tenghamn |
| 7,234,407 | B1 | 6/2007 | Levine et al. |
| 7,359,283 | B2 | 4/2008 | Vaage et al. |
| 7,408,836 | B2 | 8/2008 | Muyzert |
| 7,451,717 | B1 | 11/2008 | Levine et al. |
| 7,499,374 | B2 | 3/2009 | Ferber |
| 7,499,737 | B2 | 3/2009 | Mizuta et al. |
| 7,545,703 | B2 | 6/2009 | Lunde et al. |
| 7,646,671 | B2 | 1/2010 | Pan |
| 7,835,224 | B2 * | 11/2010 | Robertsson ............. B63B 21/56 367/20 |
| 7,993,164 | B2 | 8/2011 | Chatterjee et al. |
| 9,234,971 | B2 * | 1/2016 | Khan ..................... G01V 1/003 |
| 9,846,248 | B2 | 12/2017 | Eick |
| 10,267,939 | B2 | 4/2019 | Eick |
| 2006/0239117 | A1 * | 10/2006 | Singh .................. G01V 1/3808 367/20 |
| 2007/0013546 | A1 | 1/2007 | McConnell et al. |
| 2007/0025182 | A1 | 2/2007 | Robertsson |
| 2007/0027656 | A1 | 2/2007 | Baraniuk |
| 2008/0008037 | A1 | 1/2008 | Welker |
| 2008/0080309 | A1 | 4/2008 | Elkington et al. |
| 2008/0089174 | A1 | 4/2008 | Sollner et al. |
| 2008/0144434 | A1 | 6/2008 | Hegna et al. |
| 2008/0151688 | A1 | 6/2008 | Goujon |
| 2008/0225642 | A1 | 9/2008 | Moore |
| 2008/0285380 | A1 | 11/2008 | Rouquette |
| 2009/0006053 | A1 | 1/2009 | Carazzone et al. |
| 2009/0010101 | A1 | 1/2009 | Lunde |
| 2009/0067285 | A1 | 3/2009 | Robertsson |
| 2009/0000200 | A1 | 4/2009 | Teigen |
| 2009/0122641 | A1 | 5/2009 | Hillesund |
| 2009/0251992 | A1 | 10/2009 | Borselen |
| 2009/0262601 | A1 | 10/2009 | Hillesund |
| 2009/0279384 | A1 | 11/2009 | Pavel |
| 2009/0279386 | A1 | 11/2009 | Monk |
| 2009/0323472 | A1 | 12/2009 | Howe |
| 2010/0103772 | A1 | 4/2010 | Eick |
| 2010/0195434 | A1 | 8/2010 | Menger et al. |
| 2010/0211321 | A1 | 8/2010 | Ozdemir |
| 2011/0019502 | A1 | 1/2011 | Eick |
| 2011/0156494 | A1 | 6/2011 | Mashinsky |
| 2011/0305106 | A1 | 12/2011 | Eick et al. |
| 2011/0305107 | A1 | 12/2011 | Eick |
| 2011/0305113 | A1 | 12/2011 | Eick et al. |
| 2012/0082004 | A1 | 4/2012 | Boufounos |
| 2013/0121109 | A1 * | 5/2013 | Baardman ................ G01V 1/36 367/24 |
| 2014/0362663 | A1 | 12/2014 | Jones et al. |
| 2015/0124560 | A1 * | 5/2015 | Li ........................... G01V 1/30 367/14 |
| 2016/0018547 | A1 | 1/2016 | Eick et al. |
| 2016/0341839 | A1 | 11/2016 | Kazinnik et al. |
| 2017/0082761 | A1 | 3/2017 | Li et al. |
| 2017/0090053 | A1 | 3/2017 | Eick et al. |
| 2018/0067221 | A1 | 3/2018 | Eick et al. |
| 2018/0335536 | A1 | 11/2018 | Li et al. |
| 2019/0129050 | A1 | 5/2019 | Li |
| 2019/0293813 | A1 | 9/2019 | Li |

FOREIGN PATENT DOCUMENTS

| | | |
|---|---|---|
| WO | WO2011156491 | 12/2011 |
| WO | 2015066481 A1 | 5/2015 |
| WO | 2016009270 A1 | 1/2016 |
| WO | 2018085567 A1 | 5/2018 |

OTHER PUBLICATIONS

Li, Chengbo, et al—"Improving Streamer Data Sampling and Resolution Via Non-Uniform Optimal Design and Reconstruction", 2017, SEG International Exposition and 87th Annual Meeting; pp. 4241-4245; 5 pgs.

Li, Chengbo, et al—"Aspects of Implementing Blended Source Acquisition in the Field", 2017, SEG International Exposition and 87th Annual Meeting, pp. 42-46; 5 pgs.

Almendros, "Mapping the Sources of the Seismic Wave Field at Kilauea Volcano, Hawaii, Using Data Recorded on Multiple Seismic Antennas", Bulletin of the Seismological Society of America, vol. 92, No. 6, pp. 2333-2351, Aug. 2002, 19 pgs.

Cordsen, et al., "Planning Land 3D Seismic Surveys", Geophysical Developments Series No. 9, Society of Exploration Geophysicists (SEG), Jan. 2000, 16 pgs.

Hennenfent, "Simply Denoise: Wavefield Reconstruction Via Jittered Undersampling", 2008, Geophysics, vol. 73, Issue No. 3, pp. V19-V28; 10 pgs.

Hindriks, et al., "Reconstruction of 3D Seismic Signals Irregularly Sampled Along Two Spatial Coordinates", Geophysics, vol. 65, No. 1 (Jan.-Feb. 2000); p. 253-263, 11 pgs.

International Search Report for International Application No. PCT/US11/039635, 2 pages, dated Oct. 25, 2011.

International Search Report for International Application. No. PCT/US11/39640, 3 pages, dated Oct. 26, 2011.

Li, et al.—"Marine Towed Streamer Data Reconstruction Based on Compressive Sensing", SEG Houston 2013 Annual Meeting, pp. 3597-3602, 6 pgs.

Li, et al., "Interpolated Compressive Sensing for Seismic Data Reconstruction", SEG Las Vegas 2012 Annual Meeting, 6 pgs.

Li, et al., "A Multi-Stage Inversion Method for Simultaneous Source Deblending of Field Data", 2014, SEG Denver 2014 Annual Meeting, pp. 3610-3615.

Martin, et al., "Acquisition of Marine Point Receiver Seismic Data With a Towed Streamer", SEG 2000 Expanded Abstracts (2000), 4 pgs.

Mosher, "Compressive Seismic Imaging", SEG Las Vegas 2012 Annual Meeting, 2012, 5 pgs.

Mosher—"Increasing the Efficiency of Seismic Data Acquisition Via Compressive Sensing", Offshore Technology conference Asia, Kuala Lumpur, Malaysia, Mar. 25-28, 2014, 4 pgs.

(56) References Cited

OTHER PUBLICATIONS

Mosher—"Non-Uniform Optimal Sampling for Simultaneous Source Survey Design", SEG Denver 2014 Annual Meeting, pp. 105-109.
Musser, et al., "Streamer Positioning and Spread Stabilization for 4D Seismic", SEG/New Orleans 2006 Annual Meeting 6-9 (2006), 4 pgs.
Stolt, "Seismic Data Mapping and Reconstruction", Geophysics, vol. 67, No. 3 (May-Jun. 2002), pp. 890-908.
Zwartjes, "Fourier Reconstruction of Nonuniformly Sampled, Aliased Seismic Data", Geophysics, vol. 72, No. 1 (Jan.-Feb. 2007); p. V21-V32, 12 pgs.
Zwartjes, "Fourier Reconstruction of Nonuniformly Sampled, Aliased Data", SEG Int'l Exposition and 74th Annual Meeting, Denver, CO, Oct. 10-15, 2004, 4 pgs.
Petition for Inter Partes Review of U.S. Pat. No. 9,846,248, In-Depth *Geophysical, Inc., et al.*, v. *ConocoPhillips Company*, IPR 2019-00850, filed Mar. 20, 2019.
Office Action dated Oct. 18, 2017 for Canadian Patent Application No. 2,800,127, 4 pgs.
Office Communication dated Jul. 20, 2017 for EP Patent Application No. 11 793 092.5-1559, 5 pgs.
Response to Office Action for Canadian Patent Application No. 2,800,127 dated Apr. 6, 2017, 27 pgs.
Memorandum Opinion and Order, *Conocophillips Company* v. *In-Depth Compressive Seismic, Inc., et al.*, Civil Action No. H-18-0803, entered Apr. 26, 2019, 49 pgs.

\* cited by examiner

NON-UNIFORM OPTIMAL SURVEY DESIGN PRINCIPLES

CROSS-REFERENCE TO RELATED APPLICATIONS

This application claims benefit of U.S. Patent Application Ser. No. 62/506,859 filed May 16, 2017, entitled "NON-UNIFORM OPTIMAL SURVEY DESIGN PRINCIPLES," which is hereby incorporated by reference.

FIELD OF THE INVENTION

The present invention relates generally to seismic imaging. More particularly, but not by way of limitation, embodiments of the present invention include tools and methods for designing and implementing seismic data acquisition using non-uniform optimal sampling principles.

BACKGROUND OF THE INVENTION

Compressive sensing (CS) is an emerging field in signal processing that has applications in many different disciplines including seismic surveying. Traditionally, Nyquist-Shannon sampling theorem established the sufficient condition for a sampling rate that permits a digital signal to capture all the information from a continuous-time signal of finite bandwidth. Compressive sensing provides a new paradigm of sampling which requires far fewer measurements compared to Nyquist-Shannon sampling criterion. Thus far, compressive sensing theory suggests that successful signal recovery can be best achieved through random measurements together with sparsity of the true signal. However, applying random sampling to seismic surveys raises many concerns and uncertainties.

BRIEF SUMMARY OF THE DISCLOSURE

The present invention relates generally to seismic imaging. More particularly, but not by way of limitation, embodiments of the present invention include tools and methods for designing and implementing seismic data acquisition using non-uniform optimal sampling principles.

One method of acquiring seismic data includes determining a non-uniform optimal sampling design that includes a compressive sensing sampling grid; placing a plurality of source lines or receiver lines at a non-uniform optimal line interval; placing a plurality of receivers or nodes at a non-uniform optimal receiver interval; towing a plurality of streamers attached to a vessel, wherein the plurality of streamers is spaced apart at non-uniform optimal intervals based on the compressive sensing sampling grid; firing a plurality of shots from one or more seismic sources at non-uniform optimal shot intervals; and acquiring seismic data via the plurality of receivers or nodes.

BRIEF DESCRIPTION OF THE DRAWINGS

A more complete understanding of the present invention and benefits thereof may be acquired by referring to the follow description taken in conjunction with the accompanying drawings in which:

FIG. 1A shows a shot interval distribution from a single gun. FIG. 1B shows cable configuration.

FIG. 2A shows a shot interval distribution. FIG. 2B shows cable configuration.

FIGS. 5A-5B illustrate non-uniform optimal sampling shot design statistics from a production survey.

FIGS. 6A-6D illustrate a comparison of a non-uniform optimal sampling shot design to a conventional regular design on deblending quality.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

In signal processing, compressive sensing (CS) asserts that the exact recovery of certain signals can be obtained from far fewer measurements than as required by Shannon's sampling criterion. Generally speaking, applicability of compressive sensing for imaging depends on sparsity of signals and incoherence of sampling waveforms.

The present invention provides systems and methods for acquiring seismic data with relatively few measurements by utilizing compressive sensing principles. These principles include, but are not limited to, non-uniform optimal sampling (NUOS) design, seismic data reconstruction of data acquired using NUOS design, and blended source acquisition with NUOS design. These principles have been applied to real-world seismic survey scenarios including marine and ocean bottom seismic (OBS) and land surveys to increase data bandwidth and resolution.

Non-Uniform Optimal Sampling Design

One of the goals of non-uniform optimal sampling design is to find an optimal sampling grid that favors seismic data reconstruction. Non-uniform optimal sampling design provides a mathematical framework for optimizing both source and receiver configuration designs. As a summary, the following mathematical description of non-uniform optimal sampling design is provided.

The forward model for seismic data reconstruction can be described as $$b=Dx, b=RS^*x, x=Su, \qquad (1)$$

where b represents acquired seismic data on an irregular observed grid and u represents reconstructed seismic data on a finer regular reconstructed grid. The operator R is a restriction/sampling operator, which maps data from the reconstructed grid to the observed grid. If S is a suitably chosen dictionary (possibly over-complete), x is a sparse representation of u which has a small cardinality.

Mutual coherence is a measure of incoherency between sparsity basis S and sampling operator R. A high-fidelity data reconstruction requires the mutual coherence to be as small as possible. Assuming D=RS* can be written in a matrix form and $d_i$ represent different columns in D, the mutual coherence $\mu$ can be defined as, $$\mu(R, S) = \max_{i \neq j} |d_i^* d_j|, \, i, j = 1 \ldots n. \quad (2)$$

This is equivalent to the absolute maximum off-diagonal element of the Gram matrix, G=D*D.

The relationship between mutual coherence and successful data reconstruction is appealing for analysis. Typically, for seismic applications, this type of analysis would be prohibitively expensive to compute. However, if S is allowed to be a Fourier transform, then the definition of mutual coherence in equation 2 can be simplified to $$\mu(R) = \max_{l \neq 0} |\hat{r}_l| \quad (3)$$

where $\hat{r}_l$ are Fourier coefficients of diag(R*R). This can be interpreted as finding the largest non-DC Fourier component of a given sampling grid, which can be carried out efficiently using the fast transform. Equation 3 can serve as a proxy for mutual coherence when S is some over-complete dictionary, such as curvelet and generalized windowed Fourier transform (GWT).

Given the estimate for mutual coherence in equation 3, the non-uniform optimal sampling design seeks a sampling grid which minimizes the mutual coherence as follows, $$\min_R \mu(R) = \min_R \max_{l \neq 0} |\hat{r}_l| \quad (4)$$

The optimization problem in equation 4 can be effectively solved by, for example randomized greedy algorithms such as GRASP (Feo and Resende, 1995). In practice, the non-uniform optimal sampling design can be applied to both source and receiver sides.

Seismic Data Reconstruction

Seismic data acquired from the non-uniform optimal sampling design can be reconstructed to a finer grid by solving an analysis-based basis pursuit denoising problem:

$$\min_u \|Su\|_1 \text{ s.t. } \|Ru - b\|_2 \leq \sigma. \quad (5)$$

Here $\sigma$ is some approximation of noise level in the acquired data b. While conventional interpolation techniques focus on filling in acquisition holes or increasing fold, CS-based data reconstruction improves sampling and extends unaliased bandwidth. Seismic data must be acquired in an irregular fashion in order to employ CS-based data reconstruction. Ideally with a proper non-uniform optimal sampling design, we can increase the unaliased bandwidth by a factor of 2-4 in a certain direction.

EXAMPLE 1

A production streamer survey is described in this example to illustrate design and reconstruction of marine seismic data in accordance with the present invention. A vessel equipped with a flip-flop source shooting every 18.75 m (on average) was used to acquire 3D streamer survey. Total of 12 streamers were towed behind the vessel. Each streamer was 5 km in length and 600 m in spread width.

Figure 1A:
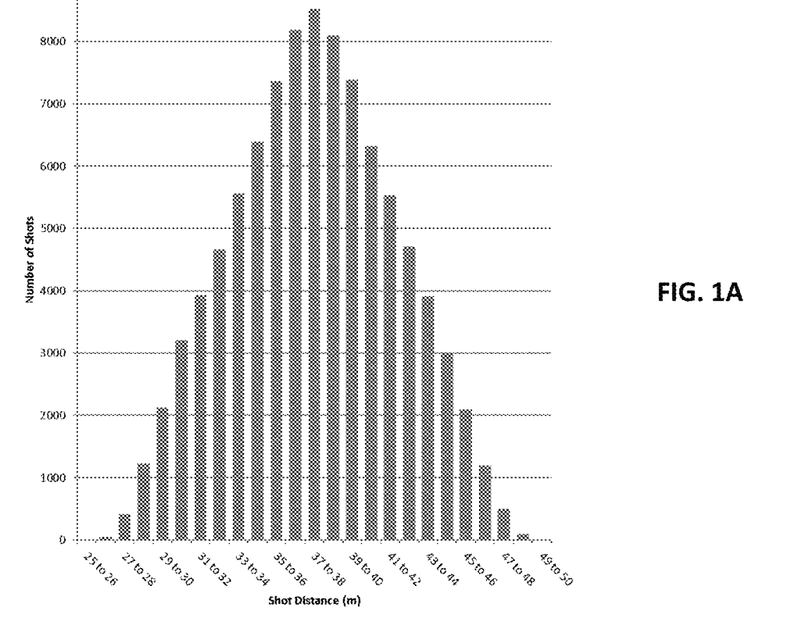
FIGS. 1A-1B illustrate an embodiment of non-uniform optimal sampling design as applied to a marine seismic survey utilizing 12 streamers.
Figure 1B:
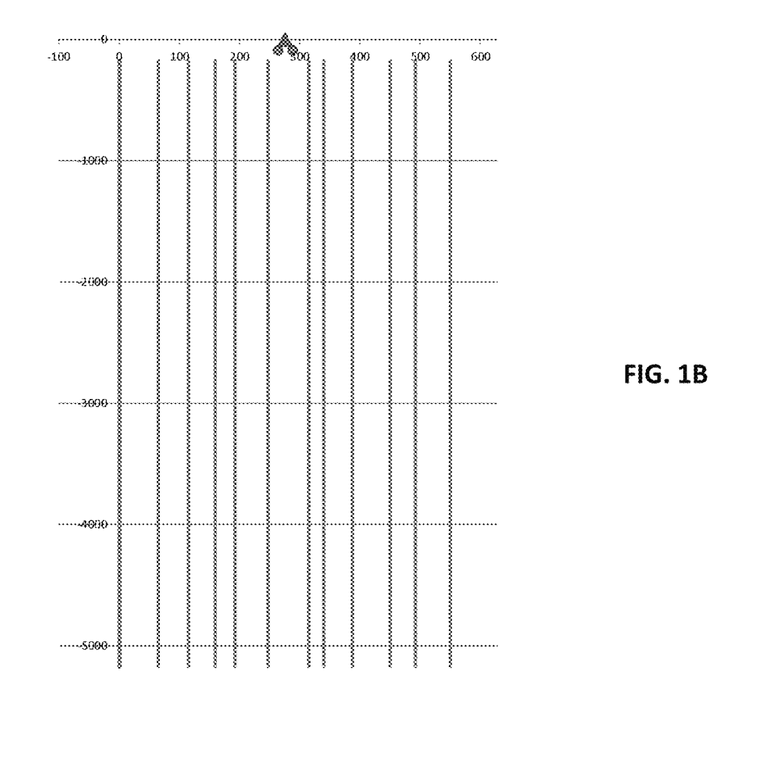
Figure 2A:
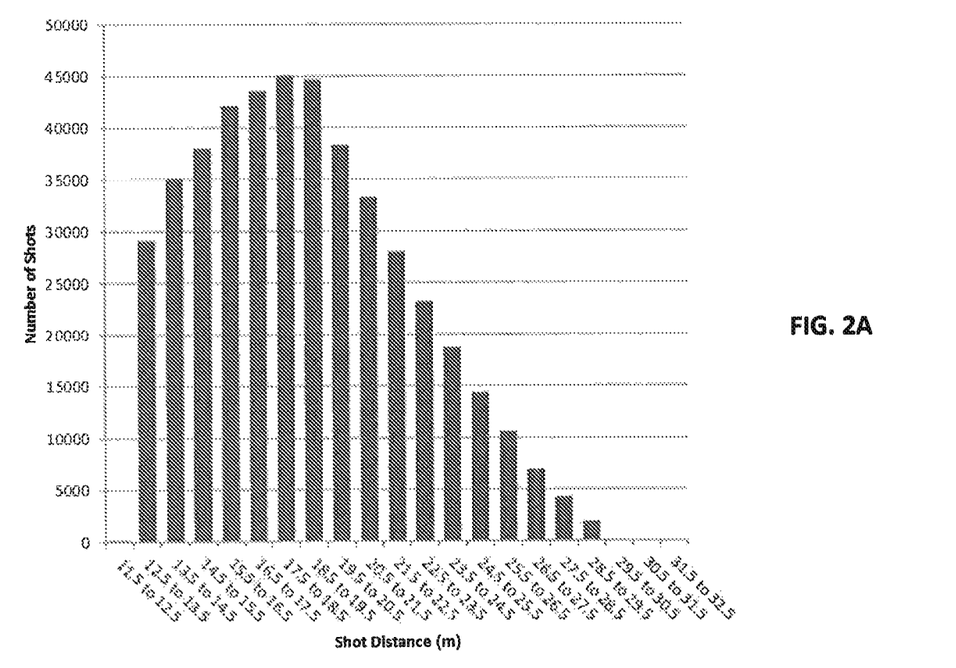
FIGS. 2A-2B illustrate an embodiment of non-uniform optimal sampling design utilizing 16 streamers.
Figure 2B:
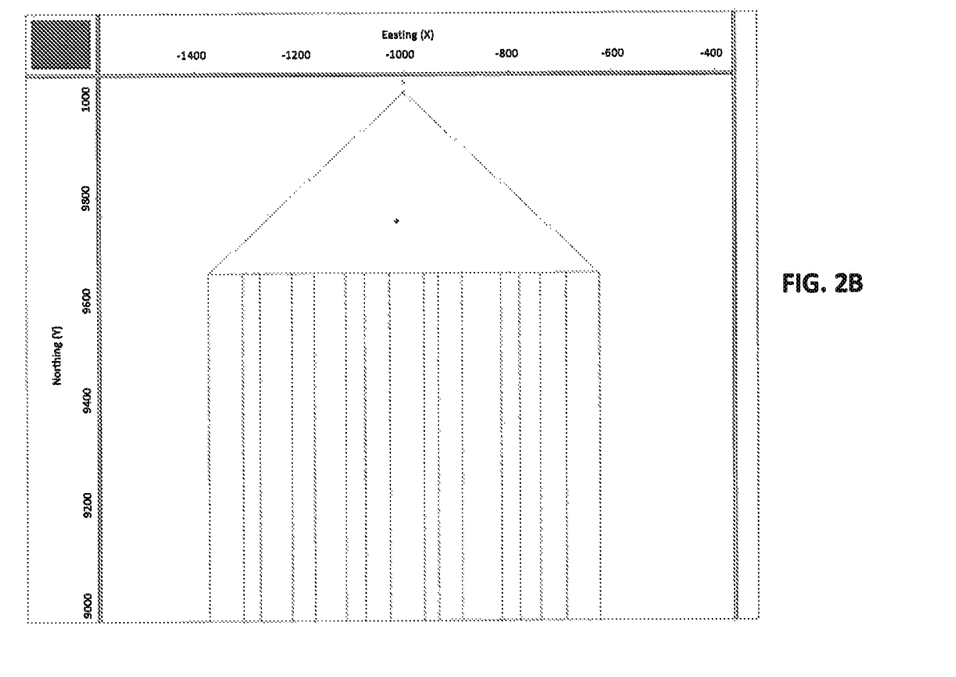

Non-uniform optimal sampling source design was utilized to improve in-line sampling. Non-uniform optimal sampling cable design was utilized to improve cross-line sampling. Design considerations include, but are not limited to, minimum airgun cycle time, minimum cable separation, spread balancing, and the like. FIGS. 1A-1B illustrates non-uniform optimal sampling design principles as applied to a 12 cable configuration. Referring to FIG. 1A, a shot interval distribution from a single gun according to an embodiment is plotted. While FIG. 1A shows shot interval ranging from about 25 m to 50 m, other distance ranges may be consistent with NUOS design depending on a number of factors such as the cable configuration. FIG. 1B shows a cable configuration according to an embodiment. As shown, the cable interval may have non-uniform spacing (ranging from about 25 m to about 200 m). FIGS. 2A-2B illustrate non-uniform optimal sampling design principles as applied to a 16 cable configuration. As shown in FIG. 2A, the shot interval may range from about 10 m to about 31 m. In some embodiments, the shot interval may range from about 5 m to about 100 m. FIG. 2B shows non-uniform spacing of a 16 cable configuration in accordance with an embodiment.

Blended Source Acquisition

In conventional seismic data acquisition, sources are activated with adequate time intervals to ensure no interference between adjacent sources. The acquisition efficiency is limited by equipment and operational constraints. In particular, the source side sampling is often coarse and aliased if long record lengths are needed to obtain energy from far offsets.

In blended source acquisition, multiple sources may be activated within a single conventional shotpoint time window. Overlapping sources in time allows dramatic reduction in time associated with acquisition. It can also improve spatial sampling by increasing shot density. The tradeoff is that sources are blended together and generate so-called "blending noise". The process of separating sources and forming interference-free records is commonly referred to as "deblending."

For marine towed streamer and ocean bottom seismic (OBS), blended source acquisition can be carried out using multiple source vessels shooting simultaneously, or a single source vessel firing at a short time interval. Early marine simultaneous source experiment used an extra source vessel sailing behind the streamer vessel. Two sources were distance-separated and F-K filter was applied to separate shots. Later on, the concept of introducing small random time delays between each pair of sources was developed. Under this time-dithering scheme, interference between two sources became asynchronous incoherent noise and could be suppressed during conventional pre-stack time migration. Recent developments proposed the time-scheduling method for OBS which required little coordination between sources. Each source was assigned a set of random source initiation times and shots were taken following these times.

Both time-dithering and time-scheduling methods required extra manipulation of shot time and sometimes even vessel speed, which further complicates field operation and lead to potential human errors. Blended source acquisition can also be applied to NUOS. The NUOS scheme puts no constraints on shot time and makes minimal operational changes compared to conventional seismic acquisition. Both sampling density and deblending quality can benefit from a joint inversion of data acquired using a NUOS design.

For blended source acquisition, the recording system should be capable of recording continuously. Data should be delivered in a format of continuous records instead of conventional shot gathers. Each continuous record or time segment is expected to contain receives information and record start and end time stamps within at least microsecond precision. The source positioning data together with shot times can be stored in navigation files modified from one of the standard formats (e.g., SPS, P1/90, P1/11, etc). To better assist inversion-based deblending, time stamps from all shots should be recorded including production, non-production and infill shots, also within at least microsecond precision.

Figure 3:
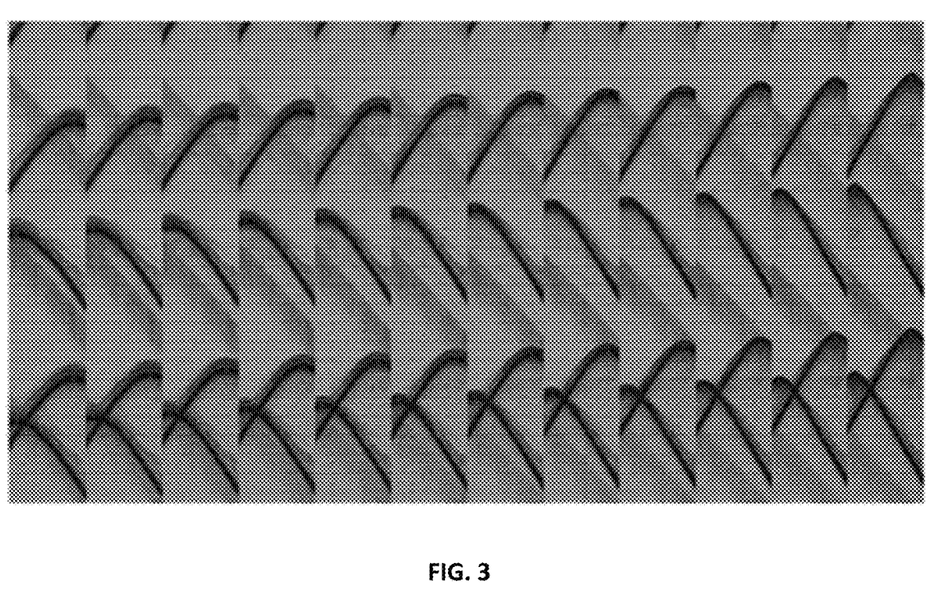
FIG. 3 illustrates an onboard quality control (QC) for continuous records.

Routine onboard QC procedures can still be employed. Continuous records can be examined onboard by displaying the "time-segment gather" (i.e., data within a certain time window sorted by receivers). In this domain, blended shots are observed as coherent energy, regardless of uniform or non-uniform shooting patterns. FIG. 3 illustrates a snapshot of onboard QC, showing a time-segment gather over the entire receiver patch. The opposite-trending moveouts indicate shots that were activated from two distanced sources. This survey employed dual-vessel simultaneous shooting with NUOS design and led to a reduction in overall survey time, including time for receiver deployment, mobilization and demobilization. Onboard processing was kept to a minimum to avoid damaging the integrity of the continuous records.

Cs-Based Survey Design Principle

Separating blended sources can be better solved under a CS framework. Forward solutions have been proposed by exploiting the sparsity of seismic data, such as the generalized windowed Fourier. The non-uniform sampling scheme favors the inversion-based deblending by promoting the incoherence of blending noise. For seismic acquisition, a measure of incoherence ("mutual coherence") is used to guide the non-uniform survey design. Referring back to equations 2-4, a proxy of mutual coherence can be effectively computed using the Fourier transform. Non-uniform optimal sampling minimizes mutual coherence to obtain an optimal survey design.

EXAMPLE 2

Figure 4:
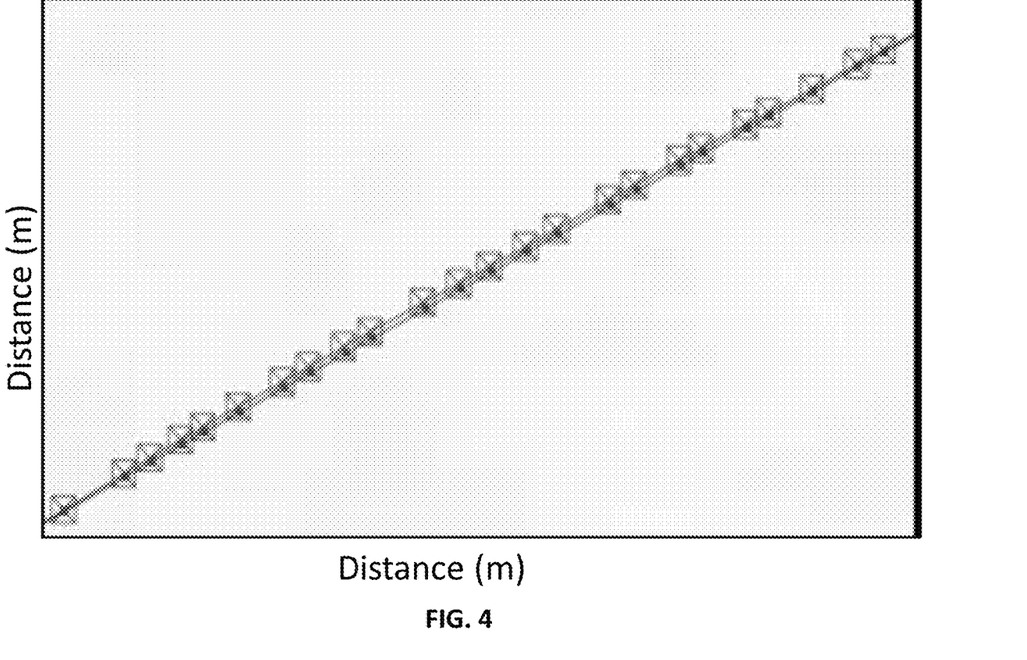
FIG. 4 illustrates implementation of non-uniform optimal sampling shot spacing in the field.

A field trial was conducted in the early stage of development. FIG. 4 illustrates an aspect of the field trial. Each red dot represents a pre-plot shot location derived from the optimization process, and each red box represents a shot point in the field. Through the course of the field trial, 0.5 m inline accuracy was achieved for 99:6% shots. The field trial removed barriers to implementing NUOS design on shots in production surveys.

Figure 5A:
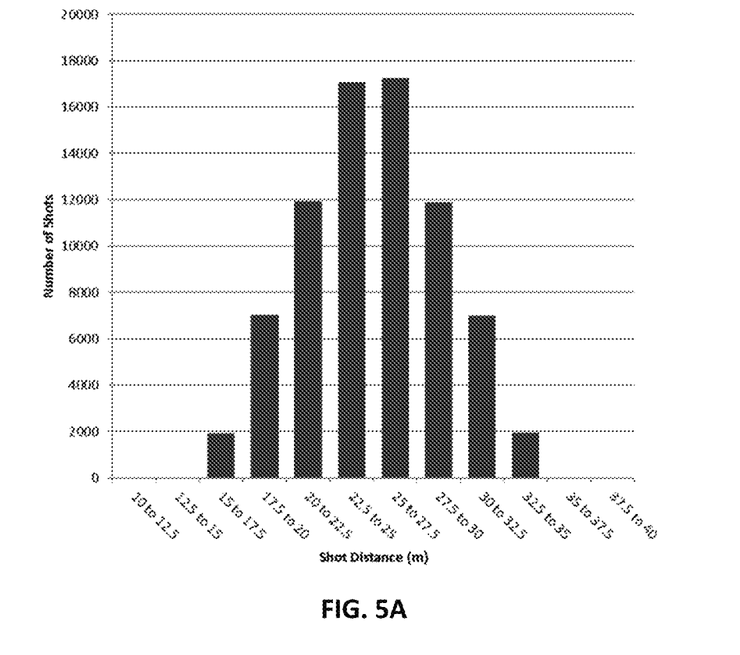
FIG. 5A shows a distribution of shot intervals.
Figure 5B:
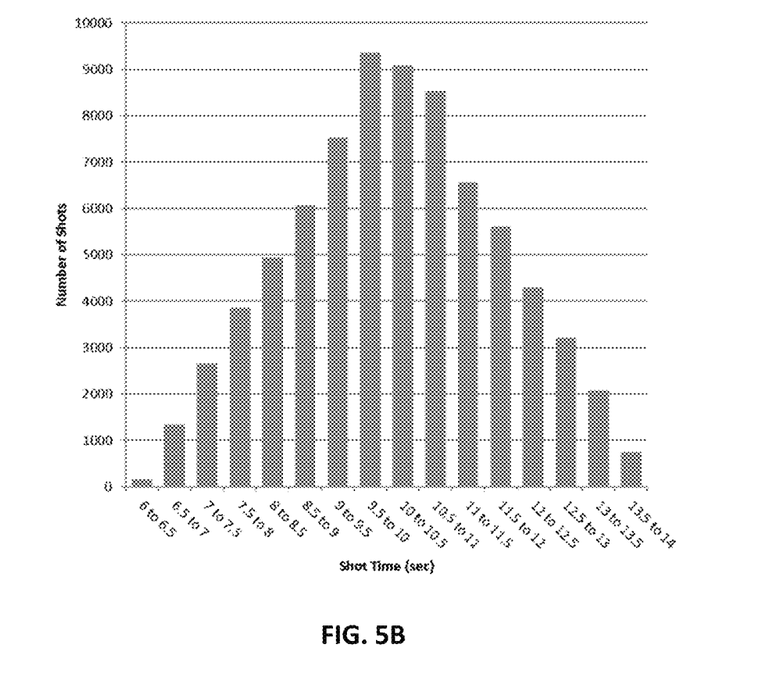
FIG. 5B shows a distribution of shot time intervals.

For blended source acquisition, we rely on the non-uniform design in space, which by nature gives rise to irregularity in time, to generate the incoherent blending pattern needed for source separation. FIGS. 5A-5B show statistics from a production survey designed with non-uniform optimal sampling shot spacing. FIG. 5A plots a distribution of shot intervals that ranged from 15 m to 35 m. FIG. 5B plots a distribution of rendered shot time intervals that ranged from 6 s to 14 s.

Figure 6A:
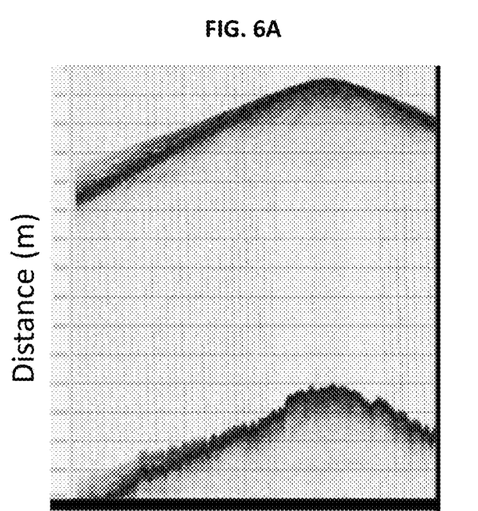
FIG. 6A shows data acquired with conventional regular design.
Figure 6B:
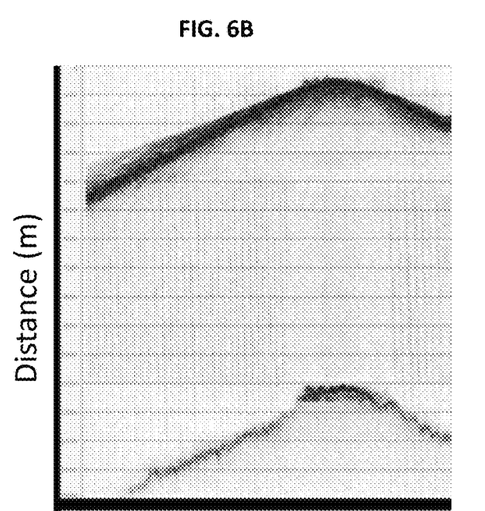
FIG. 6B shows corresponding deblending result of FIG. 6A.
Figure 6C:
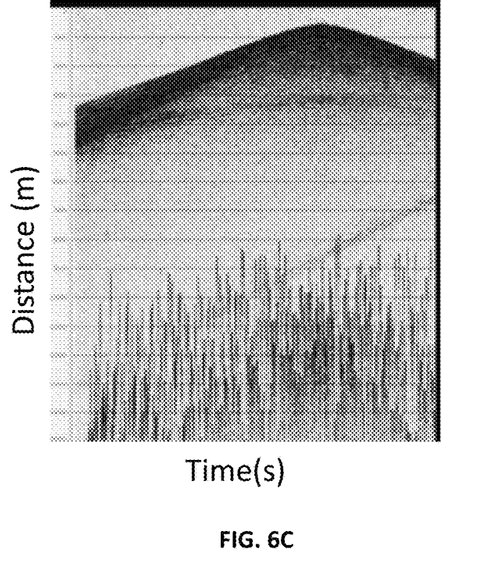
FIG. 6C shows data acquired with a non-uniform optimal sampling shot design.

FIGS. 6A-6D compare data acquired with a NUOS design and a conventional regular design, both from the same survey. Fifteen seconds record length was kept to preserve far offsets and converted waves. FIG. 6A shows a receiver gather, as part of a velocity line, with shots spaced at regular 25 m intervals. As shown, self-blending occurred after 10 s. The interference pattern was somewhat incoherent even with a regular shot spacing, thanks to natural variations in vessel speed. FIG. 6C shows the same receiver with production shots optimally spaced at nominal 25 m intervals. The interference from self-blending came in as early as 7.5 s and spread over a longer time interval. The incoherence of blending noise was significantly enhanced by the NUOS design.

Figure 6D:
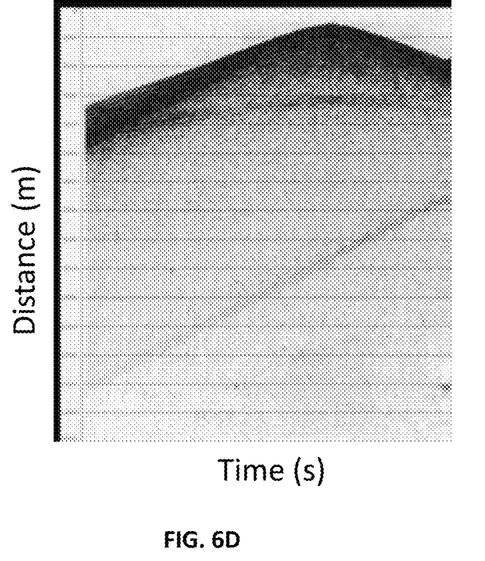
FIG. 6D shows corresponding deblending result of FIG. 6C.

The same inversion-based deblending method was applied on both datasets for a fair comparison. The method solves an analysis-based $t_l$ minimization using the nonmonotone ADM (Li et al., 2013b). FIGS. 6B and 6D show the corresponding deblending results. For data with a regular design, we see a fair amount of blending noise leaked through deblending, due to insufficient incoherence to separate signal from noise. On the other hand, a much improved deblending result was achieved from data with a NUOS design. The blending noise was reduced to a minimum while primaries were intact. This result indicates that the NUOS design was preferable for the inversion-based deblending method. A similar conclusion has been observed from dual-vessel simultaneous shooting.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A method of acquiring seismic data comprising:
    a) determining a non-uniform optimal sampling design by calculating a compressive sensing sampling grid that minimizes mutual coherence;
    b) placing a plurality of source lines or receiver lines at a non-uniform optimal line interval;
    c) placing a plurality of receivers or nodes at a non-uniform optimal receiver interval;
    d) towing a plurality of streamers attached to a vessel, wherein the plurality of streamers is spaced apart at non-uniform optimal intervals, wherein the plurality of streamers is at least three streamers;
    e) firing a plurality of shots from one or more seismic sources at non-uniform optimal shot intervals; and
    f) acquiring seismic data via the plurality of receivers or nodes.

2. The method of claim 1, wherein the seismic data is acquired via land, ocean-bottom seismic, or marine survey.

3. The method of claim 1, wherein the seismic data is sampled below Nyquist-Shannon limit.

4. The method of claim 1, further comprising:
    applying sparse inversion-based reconstruction on the seismic data.

5. The method of claim 1, wherein the plurality of streamers ranges from 6 to 50 streamers.

6. The method of claim 1, wherein each shot interval ranges from about 5 m to about 100 m.

7. The method of claim 1, wherein each receiver interval ranges from about 5 m to about 100 m.

8. The method of claim 1, wherein each streamer interval ranges from about 25 m to about 200 m.

9. The method of claim 1, wherein each line interval ranges from about 25 m to about 500 m.

10. The method of claim 1, further comprising:
applying sparse inversion-based deblending on the seismic data.

11. A method of acquiring seismic data comprising:
determining a non-uniform optimal sampling design by calculating a compressive sensing sampling grid that minimizes mutual coherence, wherein mutual coherence is determined by:

$$\mu(R, S) = \max_{i \neq j}|d_i^* d_j|, \; i, j = 1 \ldots n,$$

and mutual coherence is minimized by:

$$\min_R \mu(R) = \min_R \max_{l \neq 0}|\hat{r}_l|,$$

where S is sparsity basis, R is a sampling operator, $\mu$ mutual coherence, and $\hat{r}_l$ are Fourier coefficients of diag(R*R);
placing a plurality of source lines or receiver lines at a non-uniform optimal line interval;
placing a plurality of receivers or nodes at a non-uniform optimal receiver interval;
towing a plurality of streamers attached to a vessel, wherein the plurality of streamers is spaced apart at non-uniform optimal intervals, wherein the plurality of streamers is at least three streamers;
firing a plurality of shots from one or more seismic sources at non-uniform optimal shot intervals; and
acquiring seismic data via the plurality of receivers or nodes.

12. The method of claim 11, wherein the seismic data is acquired via land, ocean-bottom seismic, or marine survey.

13. The method of claim 11, wherein the seismic data is sampled below Nyquist-Shannon limit.

14. The method of claim 11, further comprising:
applying sparse inversion-based reconstruction on the seismic data.

15. The method of claim 11, wherein the plurality of streamers ranges from 6 to 50 streamers.

16. The method of claim 11, wherein each shot interval ranges from about 5 m to about 100 m.

17. The method of claim 11, wherein each receiver interval ranges from about 5 m to about 100 m.

18. The method of claim 11, wherein each streamer interval ranges from about 25 m to about 200 m.

19. The method of claim 11, wherein each line interval ranges from about 25 m to about 500 m.

20. The method of claim 11, further comprising:
applying sparse inversion-based deblending on the seismic data.

* * * * *